United States Patent [19]

Mughir et al.

[11] Patent Number: 5,627,413
[45] Date of Patent: May 6, 1997

[54] VOLTAGE REGULATOR DISABLE CIRCUIT

[75] Inventors: Taha Mughir, Portland; Tom Rampone, Hillsboro; Dave Landolf, Beaverton; Hal Massie, Westlynn, all of Oreg.

[73] Assignee: Intel Corporation, Santa Clara, Calif.

[21] Appl. No.: 423,978

[22] Filed: Apr. 17, 1995

[51] Int. Cl.$^6$ .................................................. H02J 3/14
[52] U.S. Cl. ........................ 307/86; 307/64; 307/85; 361/728; 361/731; 361/733; 439/65; 439/68; 439/188; 323/282
[58] Field of Search .................. 307/86, 85, 64, 307/66, 80, 81; 361/784, 728, 731, 733; 439/188, 68, 65; 323/282

[56] References Cited

U.S. PATENT DOCUMENTS 4,410,848  10/1983  Frierdich .............................. 322/25
4,638,178  1/1987  Kayser .................................. 307/85
4,675,770  6/1987  Johansson ............................ 361/18
5,186,639  2/1993  Comerci et al. .................... 439/188
5,481,436  10/1994  Werther ............................. 361/784

Primary Examiner—William M. Shoop, Jr.
Assistant Examiner—Albert W. Paladini
Attorney, Agent, or Firm—Blakely, Sokoloff, Taylor & Zafman

[57] ABSTRACT

A circuit disables an on-board voltage regulator when an upgrade voltage regulator is installed. The system including the voltage regulator disable circuit of the preferred embodiment comprises an on-board voltage regulator circuit, a receptacle, coupled to the on-board voltage regulator circuit, for receiving an upgrade voltage regulator module, and a disable circuit coupled to the on-board voltage regulator circuit and the receptacle, the disable circuit being activated upon insertion of the upgrade voltage regulator module to disable an output of the on-board voltage regulator circuit.

9 Claims, 3 Drawing Sheets

VOLTAGE REGULATOR DISABLE CIRCUIT

FIELD OF THE INVENTION

The present invention relates to voltage regulators. Specifically, the present invention relates to selectively disabling a voltage regulator.

DESCRIPTION OF RELATED ART

The power supplies in a computer system are designed to meet the specific power requirements of the integrated circuit chips (ICs) that are the components of the system. The nominal operating voltages for the ICs are typically known because most ICs are manufactured to meet industry standards for device operation. For example, common nominal supply voltages include 5.0 volts and 3.3 volts.

A co-pending patent application with Ser. No. 08/355,027 titled "A High Precision DC-DC Converter", filed Dec. 13, 1994 and assigned to Intel Corporation discloses a switching regulator circuit providing precision switching regulation without requiring a commercial switching regulator IC. The switching regulator circuit thus regulates the output voltage without requiring a separate oscillator circuit. The voltage regulator disclosed in this co-pending patent application provides the specific power requirements for the integrated circuit chips that are components of a system, for example, a motherboard. As long as the ICs on the motherboard do not require a different voltage, the disclosed voltage regulator operates satisfactorily.

However, in some circumstances, the integrated circuit on a motherboard may be upgraded with an integrated circuit that requires a different voltage, current, or operating frequency. For example, a family of microprocessors, such as the Pentium™ brand microprocessor developed by Intel Corporation, may have equivalent functionality yet different voltage, current, and operating frequency requirements for different members of the microprocessor family. Prior art systems, having voltage regulators integrated into a motherboard, are typically not compatible with an upgrade IC having different voltage requirements.

Thus, a system is needed for building flexibility into a motherboard for supporting a family of integrated circuits having different voltage requirements.

SUMMARY OF THE INVENTION

The present invention is a voltage regulator disable circuit for disabling an on-board voltage regulator if an upgrade voltage regulator is installed. The system including the voltage regulator disable circuit of the preferred embodiment comprises an on-board voltage regulator circuit, a receptacle, coupled to the on-board voltage regulator circuit, for receiving an upgrade voltage regulator module, and a disable circuit coupled to the on-board voltage regulator circuit and the receptacle, the disable circuit being activated upon insertion of the upgrade voltage regulator module to disable an output of the on-board voltage regulator circuit.

It is an advantage of the present invention that motherboard designs can be made to support a variety of integrated circuits having different voltage requirements. It is a further advantage of the present invention that no jumpers or configuration registers need to be manipulated to operate the present invention. It is a further advantage of the present invention that the mere insertion of an upgrade voltage regulator disables an on-board voltage regulator.

These and other advantages, features, and objects of the present invention will be apparent from the accompanying drawings and from the detailed description which follows below.

BRIEF DESCRIPTION OF THE DRAWINGS

The advantages, features, and objects of the method and apparatus of the present invention will be apparent from the following detailed description of the invention which includes the following figures.

DETAILED DESCRIPTION OF THE PREFERRED EMBODIMENT

The present invention is a voltage regulator disable circuit providing a means and method for upgrading the integrated circuits on a motherboard. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
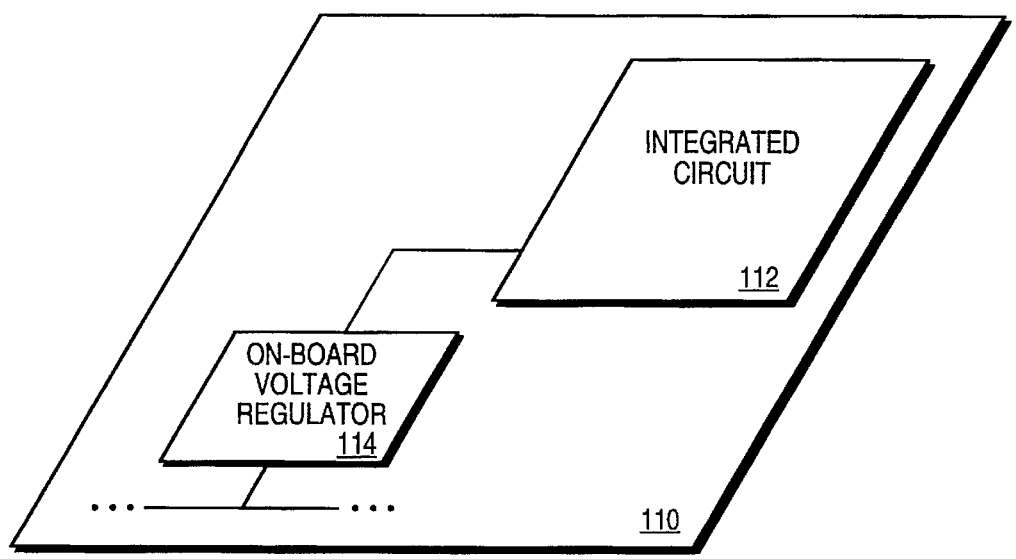
FIG. 1 illustrates a prior art motherboard with an on-board integrated circuit and on-board voltage regulator.

FIG. 1 illustrates a prior art motherboard 110 having an on-board integrated circuit 112 and an on-board voltage regulator circuit 114. In a manner well known in the art, the on-board voltage regulator 114 provides the necessary voltage output required by integrated circuit 112 and by other components on motherboard 110. On-board voltage regulator 114 is specifically designed and implemented to support only the voltage, current, and frequency requirements of integrated circuit 112. If integrated circuit 112 is replaced with a different integrated circuit having different voltage requirements, it is necessary to modify on-board voltage regulator 114 to support these new voltage requirements.

Figure 2:
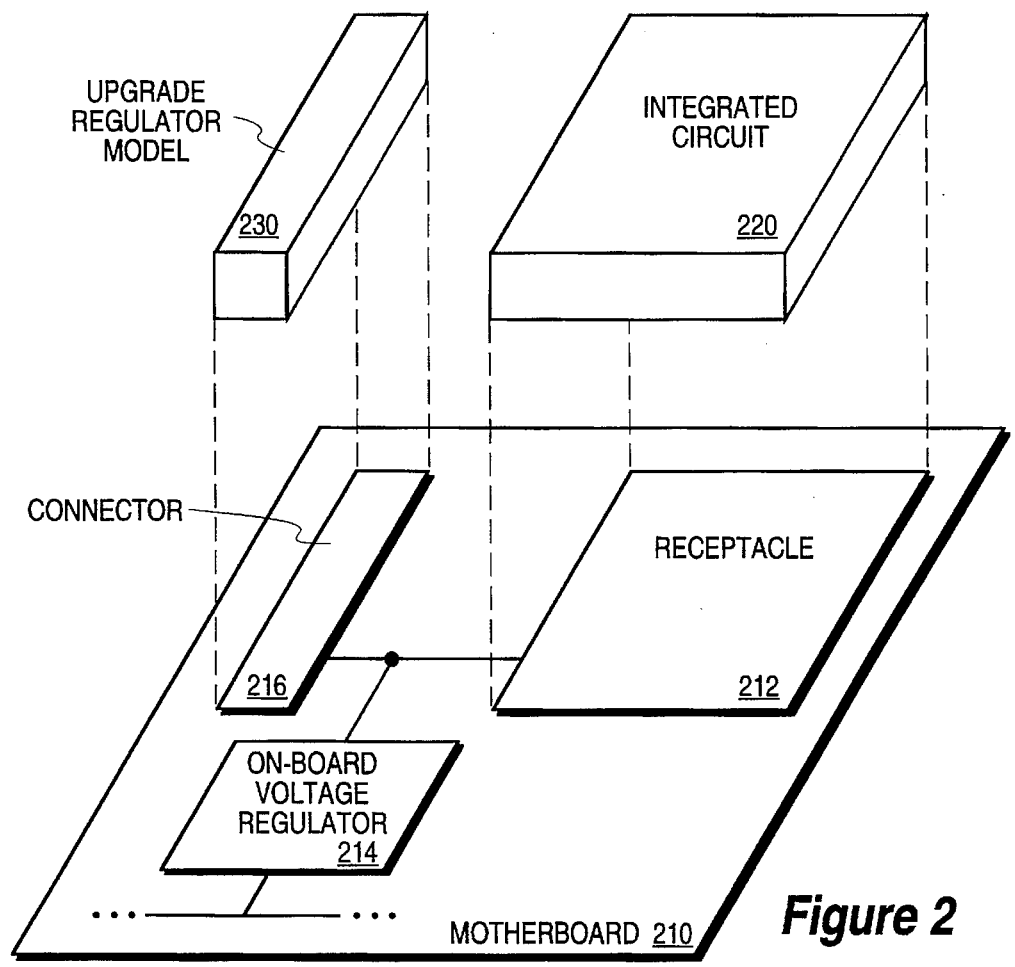
FIG. 2 illustrates a motherboard of the present invention including an upgradable integrated circuit and an upgradable voltage regulator.

Referring now to FIG. 2, the system implementation of the present invention is illustrated. In the present invention, the motherboard 210 is designed to support the removable insertion of an integrated circuit 220 into a well known connector or socket 212 installed on motherboard 210. In the preferred embodiment, integrated circuit 220 is a Pentium™ brand microprocessor manufactured by Intel Corporation. This processor has a well known pinout that mates with electrically conductive receptacles as part of socket 212. Socket 212 and other means for removably coupling integrating circuit 220 with motherboard 210 are well known to those of ordinary skill in the art.

The system of the present invention also includes an upgrade voltage regulator module (VRM) 230 which may be removably inserted into a connector 216 coupled to motherboard 210. The VRM or upgrade voltage regulator 230 converts a system supply voltage to an appropriate voltage required by upgrade processor 220. In the preferred embodiment, motherboard 210 also includes the on-board voltage regulator 214 which supplies a specific voltage corresponding to a particular processor 220. If a processor 220 having voltage requirements compatible with the voltage output of on-board voltage regulator 214, an upgrade voltage regulator 230 does not need to be installed in connector 216. In this configuration, the on-board voltage regulator 214 and processor 220 operate in a manner similar to the prior art configuration illustrated in FIG. 1. If processor 220 is upgraded to a processor having different voltage requirements, however on-board voltage regulator 214 will no longer support the upgrade processor. In this case, an upgrade voltage regulator 230 compatible with the voltage requirements of the upgrade processor 220 must be installed in connector 216 along with the upgrade processor 220 installed in receptacle 212 on motherboard 210. Thus, the upgrade integrated circuit 220 is always paired with a compatible upgrade voltage regulator 230.

One problem with the configuration illustrated in FIG. 2 is that the on-board voltage regulator 214 may conflict with an upgrade voltage regulator 230 installed in connector 216. If on-board voltage regulator 214 and upgrade voltage regulator 230 are both installed and enabled, damage to motherboard 210 or integrated circuit components on motherboard 210 may result.

The present invention provides a means for disabling the on-board voltage regulator 214 when an upgrade voltage regulator 230 is installed. If no upgrade voltage regulator 230 is installed, on-board voltage regulator 214 is enabled to regulate the voltage for integrated circuit 220. If, however an upgrade integrated circuit 220 and a corresponding upgrade voltage regulator 230 is installed in motherboard 210, the present invention disables on-board voltage regulator 214 and enables upgrade voltage regulator 230 to regulate the voltage for the upgrade integrated circuit 220.

Figure 3:
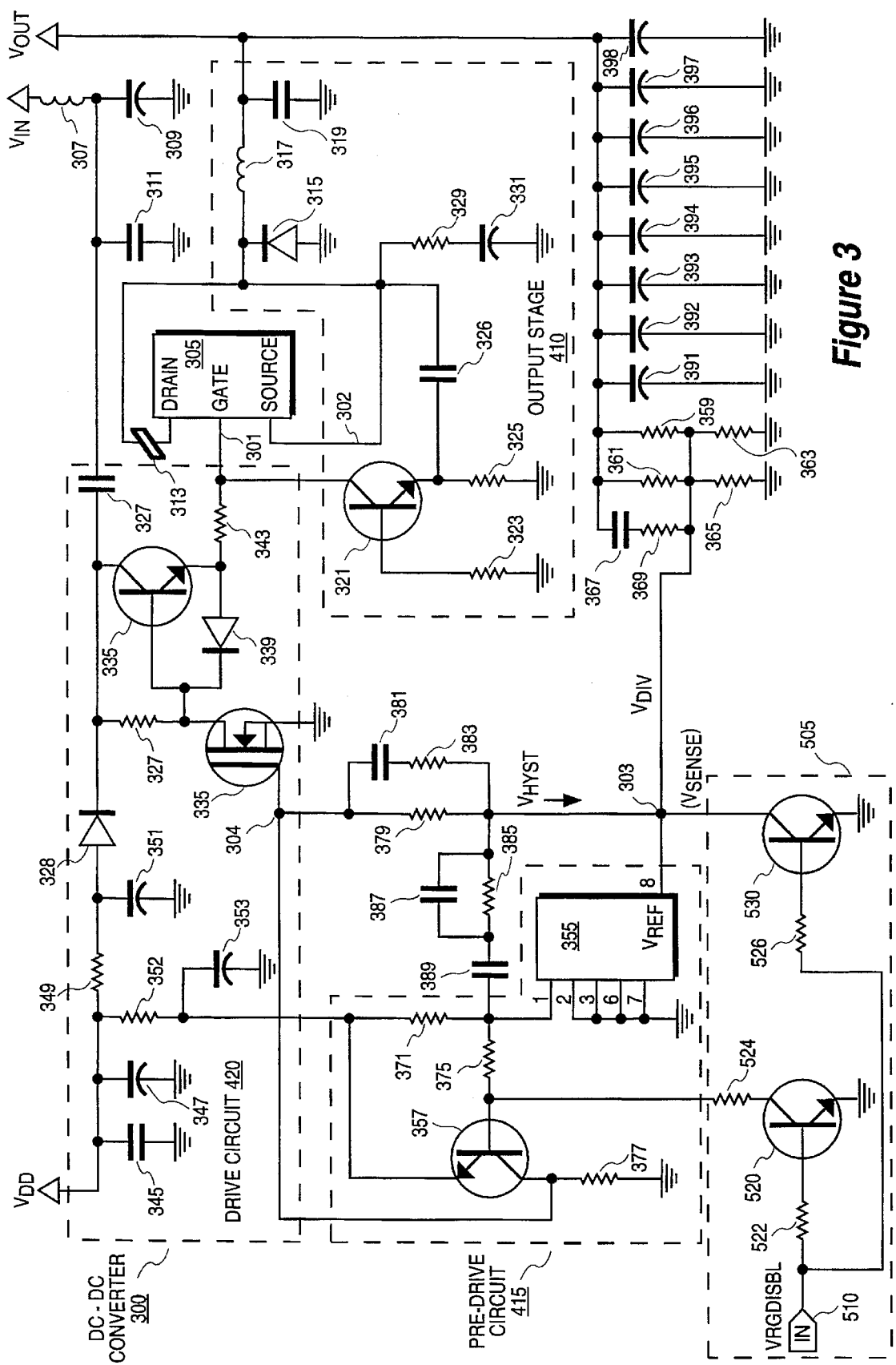
FIG. 3 is a schematic illustrating the circuitry implementing the voltage regulator disable circuit on the motherboard.
Figure 4:
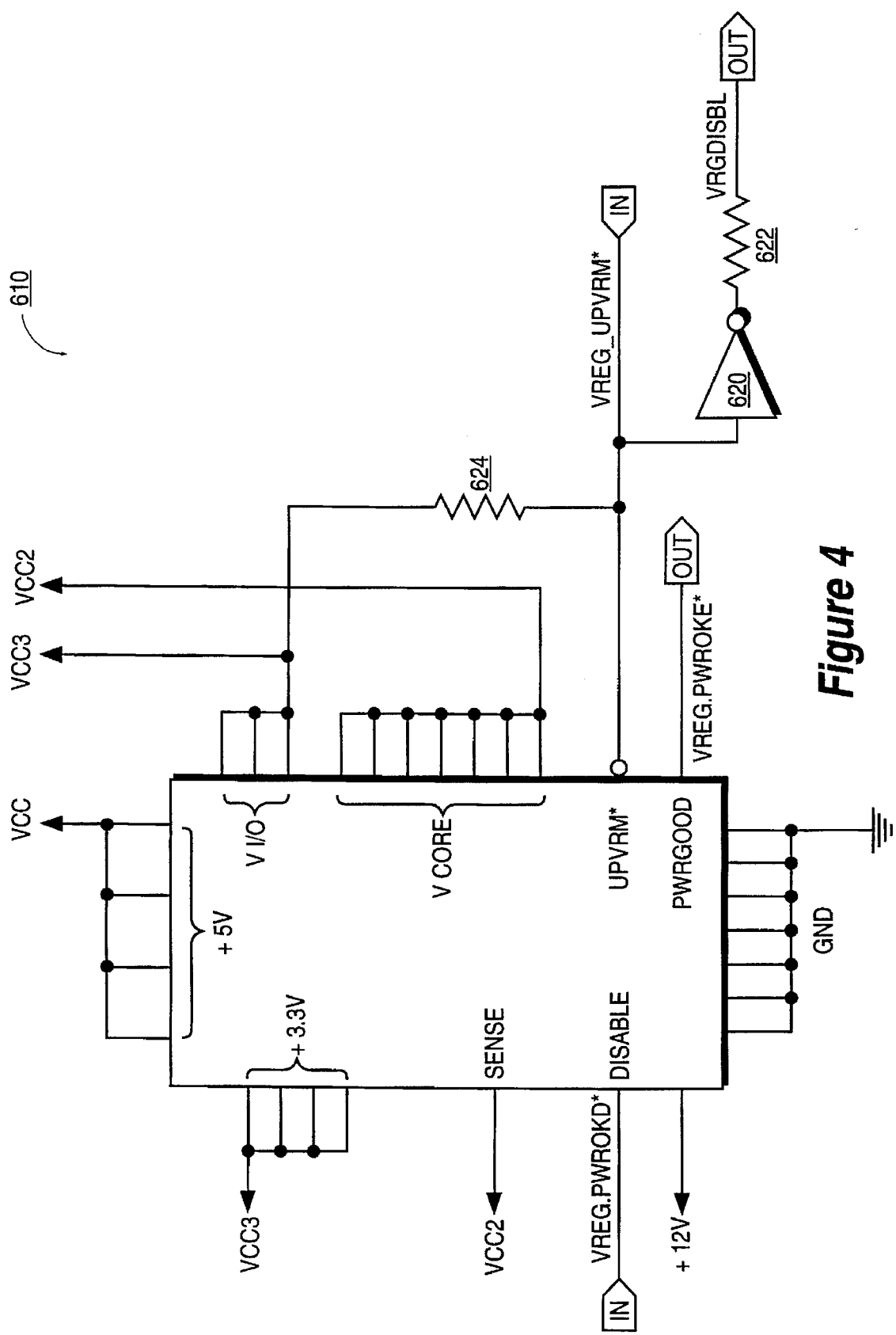
FIG. 4 illustrates the upgrade voltage regulator pinouts.

FIGS. 3 and 4 illustrate the voltage regulator disable circuit of the present invention. FIG. 3 illustrates the circuitry on motherboard 210 including the on-board voltage regulator 214 circuitry and the on-board voltage regulator disable circuitry 505. This circuitry will be described in more detail below.

Referring first to FIG. 4, the voltage regulator module 230 pin outs 610 are illustrated. In a typical integrated circuit 220, numerous voltages are required to support the operation of the integrated circuit. These particular voltages are supplied on various pins of VRM 230. For example, the processor core uses a voltage level supplied by VCORE pins coupled to a VCC2 line which is output to motherboard 210. The input/output (I/O) subsystem of the computer system supported by motherboard 210 is supplied by a different voltage level on the VIO pins of VRM 230 which are supplied on a VCC3 line. A 3.3 volt level is provided on VCC3 as shown in FIG. 4. A +5 volt level is provided on the VCC line. A +12 volt level is also supplied by VRM 230 as shown in FIG. 4. A Sense line is coupled to VCC2. An input pin of VRM 230 provides a voltage regulator power okay disable signal (VREG_PWROKD*) which is coupled to a disable input of VRM 230. The VREG_PWROKD* signal line is used to disable the VREG_PWROKE output from VRM 230. This line essentially disables the output of the VRM to other parts of the system to which it is coupled.

The present invention provides a means for disabling the on-board voltage regulator 214 merely by the insertion of an upgrade voltage regulator module 230 into connector 216 on motherboard 210. This is accomplished in the preferred embodiment using the input pin VREG_UPVRM* signal provided on an input pin to VRM 230 as shown in FIG. 4. This signal is coupled to the UPVRM* signal input of VRM 230. Because the UPVRM* signal is active low in the preferred embodiment, an open connection on this input pin will not assert the signal. When a VRM 230 is installed in connector 216, the UPVRM* pin is grounded and the signal is thereby asserted. The assertion of the UPVRM* signal enables the operation of VRM 230.

Concurrently with the assertion of UPVRM* upon the insertion of a VRM 230 in connector 216, the asserted UPVRM* signal is fed to the input side of inverter 620 illustrated in FIG. 4. The asserted UPVRM* signal is converted to an active high signal on the output side of inverter 620 and output through resistor 622 on an output pin of VRM 230 as the VRGDISBL signal. This output signal (VRGDISBL) is used to disable the on-board regulator 214 as illustrated in FIG. 3.

Referring now to FIG. 3, the on-board voltage regulator 214 is illustrated. Most of the voltage regulator circuitry illustrated in FIG. 3 is described in detail in the co-pending patent application titled "A High Precision DC-DC Converter", filed Dec. 13, 1994 and assigned to Intel Corporation. For example, the predrive circuit 415, drive circuit 420, and output stage 410 circuitry of the voltage regulator illustrated in FIG. 3 is described in detail in the above referenced co-pending patent application. This voltage regulator includes a power switching transistor 305, which is shown as an enhancement mode field effect transistor (FET) having a drain, a gate, and a source. The power switching transistor 305 alternatively may be a bipolar junction transistor (BJT), or any other appropriate device. The gate of the power switching transistor 305 is coupled to a node 301 for receiving drive pulses from the drive circuit 420; the drain is coupled to receive the DC input voltage; and the source is coupled to the output stage 410 at node 302. When the power switching transistor 305 is switched on, the DC input voltage at the drain of power switching transistor 305 is conducted to the source of power switching transistor 305 which is coupled to catch diode 315 and inductor 317. The purpose of the catch diode 315 is to prevent a voltage level that is greater than one diode drop below ground from being presented at the source of power switching transistor 305.

The predrive circuit 415 supplies predrive pulses to node 304 for switching transistor 335 on. The predrive circuit 415 includes precision voltage reference IC 355, transistor 357, and resistors 371–377. When transistor 357 is switched off, node 304 is pulled to ground by resistor 377, and transistor 335 of the drive circuit 415 is switched off. The drive signal is applied to the gate of the power switching transistor 305 at node 301 for as long as transistor 335 of the drive circuit 415 is switched off. When transistor 357 is switched on, node 304 is pulled towards VDD. The transistor 335 is switched on when the voltage at node 304 exceeds the threshold voltage of transistor 335. The drive signal is removed from the gate of the power switching transistor 305 when transistor 335 switches on.

The voltage reference IC 355 may be a TL 431A voltage reference chip or equivalent, and the pin designations shown in FIG. 3 are those of a TL 431A. The TL 431A is a high precision voltage reference having an internal reference voltage $V_{ref}$ that is accurate within one percent of its nominal value. The input (pin 8) of the voltage reference IC 355 receives a sense voltage Vsense at node 303 that depends on the output voltage $V_{out}$ supplied by the output stage 410 and a hysteresis voltage provided by the feedback connection between node 303 and node 304. The details of the voltage regulator circuit shown in FIG. 3, excluding disable circuit 505, are set forth in detail in the above referenced co-pending patent application.

The present invention includes voltage regulator disable circuitry 505. Disable circuit 505 provides a means for disabling the on-board voltage regulator 214 when an upgrade voltage regulator module 230 is inserted in connector 216. As described above in connection with FIG. 4, upgrade voltage regulator module connector 216 includes an output pin providing a signal (VRGDISBL) which is asserted when a VRM 230 is inserted in connector 216. The VRGDISBL signal is received on pin 510 as shown in FIG. 3. The VRGDISBL signal is fed to transistor 520 through resistor 522 and to transistor 530 through resistor 526. In general, transistor 520 is used for disabling the output of power switching transistor 305 and transistor 530 is used for disabling voltage reference IC 355.

When an active VRGDISBL signal is received by disable circuit 505 on pin 510 as a result of the insertion of a VRM 230 in upgrade voltage regulator connector 216, the VRGDISBL signal is received at the base input of transistors 520 and 530. As a result of this active signal, the base input of transistor 357 is pulled to ground through resistor 524. This action effectively turns on transistor 357 and subsequently disables the output of power switching transistor 305. Thus, the output of the output stage 410 of the on-board voltage regulator 214 is disabled by the assertion of the VRGDISBL signal.

When the active VRGDISBL signal is applied to the base input of transistor 530 through resistor 526, the voltage reference $V_{ref}$ input of voltage reference IC 355 is pulled to ground. As a result, the predrive circuit 415 of the on-board voltage regulator is disabled. Thus, the operation of the disable circuit 505 is to disable the on-board voltage regulator 214 when an upgrade voltage regulator 230 is installed on motherboard 210.

Thus, a means and method for disabling an on-board voltage regulator when an upgrade voltage regulator is installed is disclosed. These specific arrangements and methods described herein are merely illustrative of the principles of this invention numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. A system comprising:

an on-board voltage regulator circuit;

a receptacle, coupled to said on-board voltage regulator circuit, for receiving an upgrade voltage regulator module; and a disable circuit for disabling an output stage of said on-board voltage regulator circuit, said disable circuit being coupled to said on-board voltage regulator circuit and said receptacle, said disable circuit being activated upon insertion of said upgrade voltage regulator module.

2. The system of claim 1, wherein the disable circuit is activated upon receiving a signal from, and upon insertion of, said upgrade voltage regulator module.

3. The system of claim 1, said disable circuit being electrically or electronically activated upon insertion of said upgrade voltage regulator module to disable an output of said on-board voltage regulator circuit.

4. The system claimed in claim 1 wherein said disable circuit includes a circuit.

5. (Amended) A circuit comprising:

a first interface to an on-board voltage regulator circuit;

a second interface to an upgrade voltage regulator module; and a disable circuit for disabling a pre-drive stage of said voltage regulator circuit said disable circuit coupled to said first interface and said second interface, said disable circuit being activated upon insertion of said upgrade voltage regulator module.

6. A circuit comprising:

a first means for interfacing with an on-board voltage regulator circuit;

a second means for interfacing with an upgrade voltage regulator module;

said disabling means including a means for disabling a pre-drive stage of said on-board voltage regulator circuit, said means for disabling said on-board voltage regulator circuit, said means for disabling coupled to said first means and said second means, said disabling means being activated upon insertion of said upgrade voltage regulator module.

7. A method for disabling an on-board voltage regulator upon insertion of an upgraded voltage regulator module, said method comprising the steps of:

receiving a signal when an upgrade voltage regulator module is inserted into an interface;

activating a disable circuit to disable an on-board voltage regulator circuit in response to said signal;

said disabling step including a step of disabling a drive stage of said on-board voltage regulator circuit disabling said on-board voltage regulator circuit.

8. The method claimed in claim 7 wherein said disabling step includes a step of disabling a pre-drive stage of said on-board voltage regulator circuit.

9. The method claimed in claim 7 wherein said disabling step includes a step of disabling an output stage of said on-board voltage regulator circuit.

* * * * *

UNITED STATES PATENT AND TRADEMARK OFFICE
CERTIFICATE OF CORRECTION

PATENT NO. : 5,627,413
DATED : May 6, 1997
INVENTOR(S) : Mughir et al.

It is certified that error appears in the above-identified patent and that said Letters Patent is hereby corrected as shown below:

In column 6 at line 9 delete "circuit" and insert --circuit for disabling a pre-drive stage of said on-board voltage regulator circuit--

Signed and Sealed this

Twentieth Day of January, 1998

Attest:

BRUCE LEHMAN

Attesting Officer

Commissioner of Patents and Trademarks